US008681588B2

(12) United States Patent
Maisons

(10) Patent No.: US 8,681,588 B2
(45) Date of Patent: Mar. 25, 2014

(54) MEMORY SEISMIC DEVICE AND METHOD

(75) Inventor: Christophe Maisons, La Tour d'Aigues (FR)

(73) Assignee: Magnitude SPAS (FR)

(*) Notice: Subject to any disclaimer, the term of this patent is extended or adjusted under 35 U.S.C. 154(b) by 0 days.

(21) Appl. No.: 11/935,812

(22) Filed: Nov. 6, 2007

(65) Prior Publication Data

US 2008/0106973 A1    May 8, 2008

Related U.S. Application Data

(60) Provisional application No. 60/864,471, filed on Nov. 6, 2006.

(51) Int. Cl.
*G01V 1/18* (2006.01)

(52) U.S. Cl.
USPC .......................................................... 367/178

(58) Field of Classification Search
USPC ................................................ 367/127–190
See application file for complete search history.

(56) References Cited

U.S. PATENT DOCUMENTS

| 4,757,873 | A | | 7/1988 | Linyaev et al. | |
| 4,775,009 | A | * | 10/1988 | Wittrisch et al. | 166/250.11 |
| 4,827,457 | A | * | 5/1989 | Seeman et al. | 367/27 |
| 5,092,423 | A | | 3/1992 | Petermann | |
| 5,206,840 | A | | 4/1993 | Cobbs et al. | |
| 5,801,642 | A | | 9/1998 | Meynier | |
| 6,311,131 | B1 | * | 10/2001 | Peardon et al. | 702/14 |
| 6,426,917 | B1 | * | 7/2002 | Tabanou et al. | 367/82 |
| 7,255,173 | B2 | * | 8/2007 | Hosie et al. | 166/332.8 |
| 2003/0067843 | A1 | | 4/2003 | Therond et al. | |
| 2003/0167835 | A1 | * | 9/2003 | Sinha et al. | 73/152.16 |
| 2004/0011559 | A1 | | 1/2004 | Harvey et al. | |
| 2004/0134667 | A1 | * | 7/2004 | Brewer et al. | 166/380 |
| 2004/0163807 | A1 | | 8/2004 | Vercaemer | |
| 2005/0115711 | A1 | * | 6/2005 | Williams et al. | 166/308.1 |
| 2005/0197781 | A1 | * | 9/2005 | Harmon et al. | 702/14 |
| 2006/0081412 | A1 | | 4/2006 | Wright et al. | |
| 2006/0180303 | A1 | | 8/2006 | De Kimpe et al. | |
| 2006/0203614 | A1 | * | 9/2006 | Harmon | 367/57 |

FOREIGN PATENT DOCUMENTS

| EP | 0303536 A1 | 2/1989 |
| FR | 2881789 | 2/2005 |
| GB | 2290869 A1 | 6/1995 |

OTHER PUBLICATIONS

James Albright, et al. "Seismic Surveillance for Monitoring Reservoir Changes". Oilfield Review. vol. 6. No. 1, Jan. 1994. pp. 4-14.
Stuart Jardine, et al. "Putting a damper on Drilling's Bad Vibrations". Oilfield Review. vol. 6. No. 1, Jan. 1995. pp. 15-20.
Les Bennett, et al. "The Source for Hydraulic Fracture Characterization". Oilfield Review. Winter 2005/2006. pp. 42-57.

(Continued)

*Primary Examiner* — Luke Ratcliffe
(74) *Attorney, Agent, or Firm* — Cantor Colburn LLP

(57) ABSTRACT

Disclosed is a device for monitoring seismic events, the device including a self-contained structure adapted for being disposed within a wellbore and independently monitoring and recording seismic events, a seismic sensor, a memory device in communication with the seismic sensor for receiving seismic data from the seismic sensor in response to the seismic events, a power source to allow for independent operation of the device, and a processor for processing the data. Also disclosed is a method for using the device.

20 Claims, 3 Drawing Sheets

(56) References Cited

OTHER PUBLICATIONS

Andrey Bakulin, et al. "Downhole acoustic surveillance of deepwater wells". The Leading Edge. Apr. 2008. pp. 518-531.

Hirokazu Moriy, et al. Multiplet-clustering Analysis Reveals Structural Details within Seismic Cloud at the Soultz Geothermal Field, France. Bul. Seism. Soc. Am. pp. 1-31, 2003.

Torsten Clemens, "Resrvoir Performance and Monitoring". Technology Focus. JPT. Sep. 2008. pp. 84-99.

Yves Serge Simon. "Stress and fracture characterization in a shale reservoir, North Texas, using correlation between new seismic attributes and well data". A Thesis Presented to the Faculty of the Department of Geosciences, University of Houston. pp. 1-20. Dec. 2005.

Stephen Wilson, et al. "Passive seismic makes sense for 4D reservoir monitoring". firstbreak vol. 23, Oct. 2004. pp. 59-65.

Erick Baziw, et al. "A Rao-Blackwellised type algorithm for passive seismic event detection". pp. 135-164, 2003.

Microseismic hydraulic fracture monitoring. Geospace Technologies. www.geospacetech.com. 2 pages, 2005.

Giancarlo Bernasconi, et al. "Efficient Data Compression for Seismic-While-Drilling Applications". IEEE Transactions on Geoscience and Remote Sensing, vol. 41, No. 3, Mar. 2003.

International Search Report for International Application No. PCT/IB2007/004535. Mailed Sep. 22, 2008.

Written Opinion of the International Searching Authority or International Application No. PCT/IB2007/004535. Mailed Sep. 22, 2008.

\* cited by examiner

MEMORY SEISMIC DEVICE AND METHOD

CROSS REFERENCE TO RELATED APPLICATIONS

Under 35 U.S.C. §119(e), this application claims the benefit of U.S. Provisional Application No. 60/864,471, filed Nov. 6, 2006, the entire disclosure of which is incorporated herein by reference.

BACKGROUND OF THE INVENTION

1. Field of the Invention

The teachings herein relate to seismic tools used in subterranean exploration, and in particular, to techniques for minimizing noise and providing for detection of microseismic events.

2. Background of the Related Art

Subterranean formations may be monitored using one or more seismic receivers. The receivers may be geophones placed at the surface or submerged in wells or on the ocean floor. Also, the receivers may be hydrophones placed in those same locations, but sensitive to only certain types of waves. The receivers placed in wells may be shallow (usually above the formation of interest) or deep (at or below the formation of interest). Seismic receivers may be sensitive to seismic waves along a certain axis or those traveling on any axis. Likewise, the receivers may be sensitive to only certain types of seismic waves, or several types. Those sensitive to a certain axis of travel, called directional receivers, may be coupled with other directional receivers. For example, a directional receiver may be coupled with two other directional receivers in a set of three orthogonal receivers which collect information about the waves in three dimensions. This three-dimensional information may be rotated mathematically through the use of trigonometric functions in order to derive information as to wave travel in the x-, y-, and z-axis relative to gravity. Alternatively, mathematical rotation may provide translation of the data relative to a wellbore, a cardinal direction, or any other reference point.

Microseismic monitoring concerns passively monitoring a formation for seismic events which are very small. Such events may include the seismic effects generated in a formation by fracturing, depletion, flooding, treatment, fault movement, collapse, water breakthrough, compaction or other similar subterranean interventions or effects. One of the main problems with microseismic monitoring, as with other forms of seismic monitoring, is that of noise. With microseismic events, however, the problem is emphasized because the signal strength is generally very small. This means, in turn, that a small amount of noise which would not cause any significant effect as to a regular, active seismic survey causes a significant degradation of the signal to noise ratio in the microseismic survey.

One source of noise that is significant is that introduced by the use of a wire to communicate with a seismic sensor placed down a well. The wire may transmit to the sensor vibrations from the surface and may introduce temperature changes which may affect the sensor's operation. Additionally, the wires are subject to corrosion and other degradations, which affect the produced results.

The geology of the microseismic environment is also of interest. Different geological layers are composed of different materials which transmit seismic waves at different velocities. It will be appreciated that when a source occurs in a high-velocity layer, its transmission through to a lower-velocity layer will cause attenuation, as much of the wave energy is reflected back into the high-velocity layer. When a seismic signal must travel through many layers, the attenuation may be significant. Therefore, it is generally desirable to avoid as many layers between the source and the receiver as possible.

Microseismic surveys include receiving data from a receiver, locating data which exceeds some threshold, and analyzing those over-threshold data in order to determine information about certain events. Data which does not meet the threshold is discarded or simply not recorded as noise data.

Microseismic data may be analyzed as a set, with several receivers providing data for a joint analysis. Data is collected from a receiver and related to the other data collected from other receivers in order to derive additional information about the formation. Information from three receivers, for example, may be triangulated in order to estimate the location of a seismic event.

What is needed is a system for detection of microseismic events. Preferably, the system provides for event detection with a degree of sensitivity that permits location of microseismic events and minimizes noise.

SUMMARY THE INVENTION

Disclosed is a device for monitoring seismic events, the device including a self-contained structure adapted for being disposed within a wellbore and independently monitoring and recording seismic events, a seismic sensor, a memory device in communication with the seismic sensor for receiving seismic data from the seismic sensor in response to the seismic events, a power source to allow for independent operation of the device, and a processor for processing the data.

Also disclosed is a method for monitoring seismic events, the method including disposing within a wellbore a device for monitoring microseismic events that comprises a self-contained structure adapted for being disposed within a wellbore and independently recording seismic events, monitoring the seismic events with the device, and processing the microseismic data.

Further disclosed is a device for monitoring seismic events, the device including a self-contained structure adapted for being disposed within a wellbore and independently monitoring and recording seismic events, first means for recording data indicative of the seismic waves, second means for processing the data recorded by the first means, third means for storing the data generated by the first means, and fourth means for providing power to at least one of the first means, the second means and the third means.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Subterranean formations are of interest for a variety of reasons. Such formations may be used for the production of hydrocarbons, the storage of hydrocarbons or other substances, mining operations or a variety of other uses. One method used to obtain information regarding subterranean formations is to use acoustic or seismic waves to interrogate the formation. Seismic waves may be generated into the formation and the resulting reflected waves received and analyzed in order to provide information about the geology of the formation. Such interrogations are referred to as active seismic surveys.

Microseismic monitoring concerns passively monitoring a formation for seismic events which are very small. For passive monitoring, the formation is not interrogated, per se, but seismic receivers are placed to receive directly any seismic waves generated by events occurring within the formation. Such events may include the seismic effects generated in a formation by fracturing, depletion, flooding, treatment, fault movement, collapse, water breakthrough, compaction or other similar subterranean interventions or effects. This additional information about these events may be very useful in order to dictate certain interventions in order to enhance the use of the formation or provide additional safety measures in certain situations. For example, it is common in the hydrocarbon production industry to fracture or "frac" a formation. During this operation, fluid and propant is pumped down a well at high pressure in order to generate additional fracturing within a zone of the well. The propant is pumped into these fractures and maintains them after the pressure is removed. Monitoring the seismic waves generated during and immediately after a frac operation can provide critical information about the operation, such as the direction and extent of the fractures being generated.

In yet another exemplary application, microseismic monitoring may be used to provide long-term monitoring for subterranean storage facilities and formations from which hydrocarbons or water is being produced. Under certain conditions, the integrity of these formations may become compromised, causing collapse. Such collapses may pose a safety concern for those on the surface, as entire sections of ground may fall into the collapse. However, often certain characteristic small seismic waves may precede such failures, permitting remedial measures to delay the collapse and ultimately some warning of the impending collapse to allow for isolation of any dangerous areas from personnel.

Figure 1:
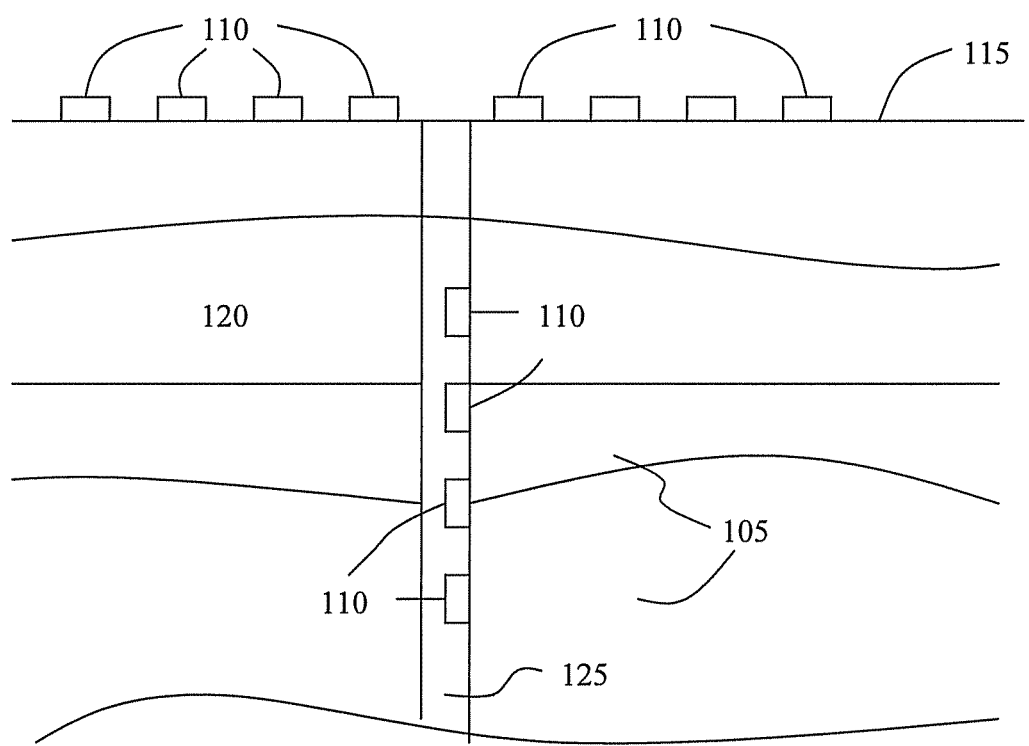
FIG. 1 illustrates a plurality of seismic receivers disposed on a surface above one or more geologic formations, and disposed with a wellbore.

Referring to FIG. 1, in some embodiments, one or more subterranean formations 105 are monitored using one or more seismic receivers 110. Each receiver 110 may be a geophone (as shown in FIG. 1) or a hydrophone submerged in wells or on the ocean floor. Similar receivers well appreciated in the art, either now or in the future, may also be used. As shown in FIG. 1, the receivers 110 may be placed on the surface 115 of the earth 120 surrounding the formations 105, and may also be disposed within a wellbore 125 that has been drilled into the earth 120 and through the formations 105. As known in the art, the term "wellbore" 125 is generally synonymous with the terms "well" and "borehole".

The seismic receivers 110 may be placed in shallow wells (usually above the formation of interest) or deep wells (at or below the formation of interest). The seismic receivers 110 may be sensitive to seismic waves along a certain axis or those traveling on any axis. Likewise, the receivers 110 may be sensitive to only certain types of seismic waves, or several types. Those receivers 110 sensitive to certain axis of travel, called directional receivers 110, may be coupled with other directional receivers 110. As an example, multiple directional receivers 110 may be coupled together in a set of three orthogonal receivers 110 which collect information about the waves in three dimensions. This three-dimensional information may be rotated mathematically through the use of trigonometric functions in order to derive information as to wave travel in the x-, y-, and z-axis relative to gravity. Alternatively, mathematical rotation may provide translation of the data relative to a wellbore, a cardinal direction, or any other reference point.

The seismic waves of interest for microseismic monitoring are generally of very small amplitude. As small amounts of noise will affect the signal to noise ratio of the received signals greatly, it is advantageous to place the receivers 110 in an area where noise is minimized. Ideally, each receiver 110 should be placed as close to the source as possible. Such a placement maximizes the signal to noise ratio appreciated from the receiver 110. Though receivers 110 may be placed undersea, one embodiment places the receivers 110 beneath the weather layer or deeper. The weather layer is the geological layer under which the effects of climatological changes (wind, rain, temperature, humidity, etc.) are not detectable. Deeper placement may permit an enhanced detection capability.

Figure 2:
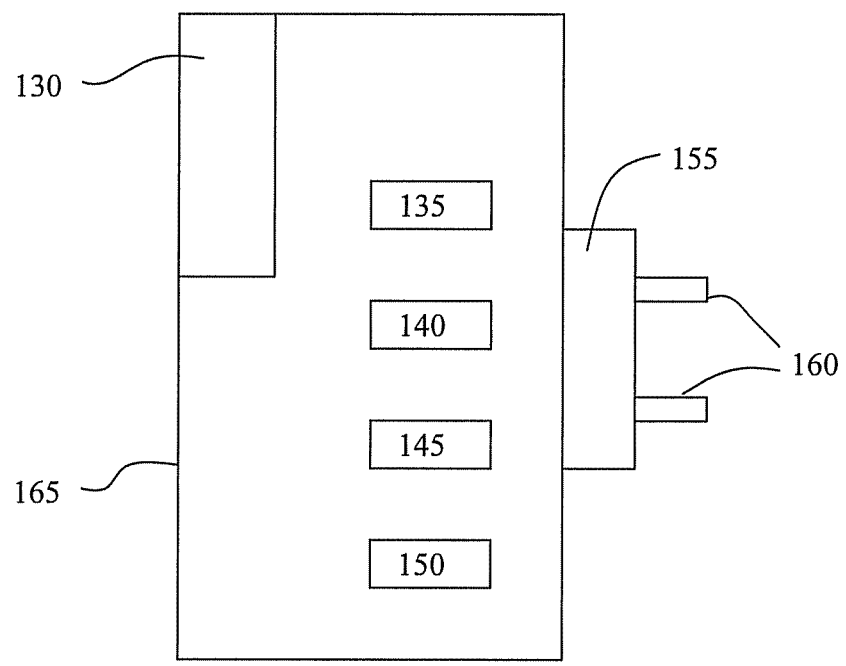
FIG. 2 illustrates an embodiment of a seismic receiver.

FIG. 2 illustrates an embodiment of the seismic receiver 110 according to the present invention. The receiver 110 is configured to monitor seismic events by receiving seismic waves from one or more seismic events. The seismic receiver 110 is self-contained, and includes a seismic sensor 130 and a memory device or system 135 suitable for recording data from events detected by the seismic sensor 130 over a desired period of time, and preferably over a relatively long period of time. The seismic sensor 130 may be an analog or digital sensor. The receiver 110 may include a clock or other time measurement device 140 suitable for noting the time at which data is received from a sensor 130. The receiver 110 further may include a processor 145, such as a microprocessor, suitable for basic pre-processing or other processing of data from the sensor 130 and/or the memory device 135. The receiver 110 may also include a power source 150, such as a battery, so as to permit operation without reliance upon a wireline connection to the surface. The receiver 110 may further include a locking mechanism 155 suitable for affixing the receiver 110 to the wellbore 125 or casing. In one embodiment, the receiver 110 also features a hollow portion through the middle (not shown), so as to permit further operations in the wellbore 125 while it is placed therein.

In one embodiment, the processor 145 is adapted for processing the data received from the sensor 130. The data received from the sensor 130 may be compressed or otherwise processed to reduce the amount of data required for storage. Reduction of the data necessary for storage allows for the seismic receiver 110 to have a longer recording period before it must be removed from, for example, wellbore 125. The data may be in the form of a seismic trace, which includes a plurality of data points representing a seismic wave over a selected period of time. This data may also be referred to as "trace data". In one embodiment, the data may be recorded as a waveform showing wave measurements (such as amplitude) over the period of time.

In another embodiment, the processor 145 is adapted to compute one or more of various statistical attributes of the data received from the sensor 130. Examples of attributes include amplitude, dip, frequency, phase, polarity and others. Attributes may be computed for individual instances in time or for multiple instances over a selected period of time. Attributes may be computed for a selected trace or waveform.

In another embodiment, the processor 145 may store data in the memory device 135. The processor may store the trace data for each receiver (or receiver channel) and/or attributes in the memory device 135.

In another embodiment, the processor 145 may store the attributes with the waveform for each trace. Alternatively, the processor 145 may store only the attributes of the trace received from a receiver. This allows for a reduction of the amount of memory required for recording a seismic event or other activity.

In one embodiment, the processor 145 is further adapted to store only attributes for selected traces, e.g., traces representing selected microseismic events, and store both the waveforms and attributes for other seismic events. The processor 145 may, for example, recognize previously recorded attributes and/or waveforms and determine whether a respective event is similar to or matches a previously recorded event. In the case that the memory device 135 includes attributes and waveforms for a previous event that is similar to the attributes and waveforms for the respective event, the processor may record only the attributes for the respective event.

The processor 145 may also be adapted to compute and store attributes of data which may include background noise, or what may be considered noise. The attributes of instances of noise may be stored in the memory 135 and compared with other instances of background noise to determine, for example, recurring patterns of noise or potential seismic events. The processor 145 may thus be able to identify possible sources of background noise and/or events by comparison with previous recorded attributes.

It will be appreciated that the memory device 135 (also referred to simply as "memory") provided may be at least one of several types. Conventional or hardened hard drives may be used, depending upon the environment where the receiver is to be placed. Random access memory (RAM), including SRAM or DRAM, may be used in order to provide a more compact or more robust package. Read only memories may also be used, such as EPROMs or the like. Further, optical storage may be used.

The clock 140 provided in the receiver 110 generally provides significant sensitivity. Such sensitivity is particularly useful for coordinating the results of a survey with the results of other surveys in order to triangulate the location of seismic events.

The self-contained receiver 110 may be lowered into a wellbore, such as the wellbore 125 shown in FIG. 1, on a conventional wireline or slickline. In some embodiments, once the receiver 110 is at the location in which sensing is desired, the locking mechanism 155 is activated so as to become affixed to the casing or side of the wellbore 125.

Referring again to FIG. 2, the receiver 110 may be affixed to the wellbore 125 by way of the locking mechanism 155. In the embodiment shown in FIG. 2, the locking mechanism 155 includes one or more feet or other protrusions 160 which extend out to contact the wellbore 125 or casing disposed therein. In other embodiments, any number of screws, wedges, slips, magnets or similar devices may be used to hold the receiver 110 in place. Similarly, several different activation methods could be used, including without limitation the use of threaded rods, piezoelectrics, electromagnetics, springs, hydraulics and the like.

In one embodiment, the sensor 130 of the receiver 110 is embedded or disposed in the side of the wellbore 125 and is connected in communication with the remaining components such as the memory device 135, the clock 140, the processor 145, and the power source 150. The receiver 110 may include one or more permanent sensors 130, which are cemented or otherwise embedded in place in the wellbore 125, which may or may not include casing. In this embodiment, the memory device 135, the battery or other power source 150, and the microprocessor 145 portions of the receiver 110 may be located above the cementing and connected to the sensor 130 by wires, fiber optics or any one of several other communication media. In alternate embodiments, however, the receiver 110 may be placed within a cased portion of the wellbore 125 and is designed as a long-term but temporary addition to the wellbore 125.

The geometry of the placement of the receivers 110 may be of several types in order to facilitate processing. It will be appreciated that a square grid, triangular grid or hexagonal grid may facilitate processing the results, but may not always be possible depending upon the environment. Accordingly, any configuration of the set of receivers 110 may be used, all falling within the bounds of the invention.

Generally, the receivers 110 are self-contained and adapted for operation in the absence of a connection to or communication with the surface. In one embodiment, the receivers 110 each include a housing 165. The receivers 110 may be self-contained by including one or more of the sensor 130, the memory device 135 and the power source 150 in the housing 165 or connected to the housing 165. Other components such as the clock 140 and the processor 145 may also be included in or connected to the housing 165. The housing 165 may be adapted for, and made from material sufficient for, protecting the components therein from environmental factors such as temperature, pressure, impacts from material, vibrations and others. In another embodiment, one or more of the components included in each of the receivers 110 may be located outside of the housing 165 and included in separate housing(s) connected to and/or proximate to the housing 165.

Generally, the receivers 110 are also adapted for independently monitoring and recording seismic events. For example, each of the receivers 110 may include the memory device 135 so that monitoring and recording may be initiated and performed independent of any connection to or communication with the surface or other device. In another example, each receiver 110 may include the processor 145 to independently initiate and/or manage monitoring and recording.

Accordingly, once a receiver 110 is placed within the wellbore 125, such as by using the wireline or slickline, the wireline or slickline is detachable from the receiver 110, which remains affixed to the wellbore 125 or casing therein. The wireline or slickline may then be retrieved entirely and the receiver 110 left to record events within the wellbore 125. In this regard, it may be considered that each receiver 110 is capable of independent monitoring and recording of seismic events.

Figure 3:
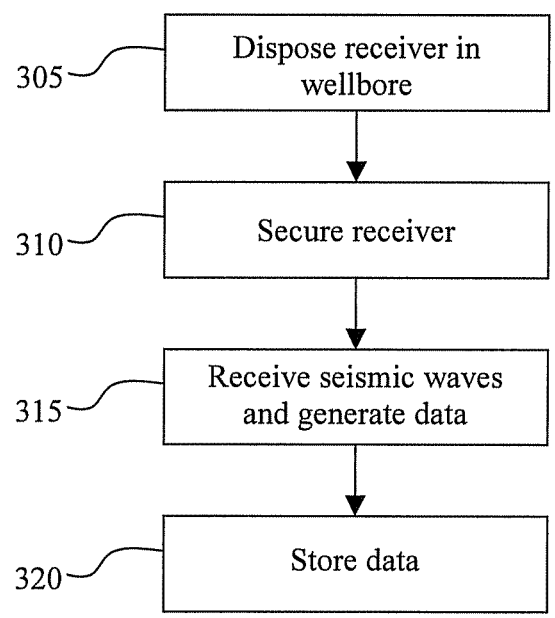
FIG. 3 is a flowchart illustrating exemplary aspects of a method for monitoring seismic events.

FIG. 3 illustrates a method 300 for monitoring seismic events, which includes one or more stages 305, 310, 315 and 320. In some embodiments, the monitoring may be active, passive, and/or microseismic monitoring. In the first stage 305, the receiver 110 is disposed in the wellbore 125, for example by lowering the receiver 110 to a desired depth in the wellbore 125, such as by using the wireline or slickline.

In the second stage 310, the receiver 110 is secured or affixed to the wellbore 125, such as by at least one of activating the locking mechanism 155, disposing the device and/or the sensor 130 in the side of the wellbore 125 or in casing, and cementing at least the sensor 130 in the side of the wellbore 125.

In a third stage 315, seismic events may be monitored via the seismic sensor 130, which receives seismic waves from one or more seismic events, and generates data indicative of the seismic waves.

In a fourth stage 320, the data may be recorded to, i.e., transmitted to and stored in, the memory device 135. In one embodiment, the data is recorded to the memory device 135 by the processor 145.

In one embodiment, the data received from the sensor may be processed, for example, to compress the data or otherwise reduce the amount of data stored in the memory device 135.

In another embodiment, the data is processed to compute one or more statistical attributes of the data received from the sensor 130. The data (such as the trace data and/or waveform) and/or the one or more attributes may be recorded in the memory device 135.

In another embodiment, the data is processed to determine whether both the waveform representing the data and the attributes are recorded in the memory device 135. For example, the attribute(s) and/or waveform for a respective set of data or trace may be compared to previously recorded attribute(s) and/or waveforms. Based on this comparison, if the respective data is sufficiently similar to the previously recorded data, only the attribute(s) of the respective data may be recorded in the memory device 135. Alternatively, if the respective data is not sufficiently similar, both the data and the attribute(s) may be recorded. In one embodiment, data is considered sufficiently similar if one or more attributes of the respective data have values within a selected range relative to the previously recorded attributes.

In another embodiment, the attributes may be compared to previously recorded attribute(s) to identify known seismic events and/or known sources of noise. In one example, the attribute(s) of the data may be compared to attribute(s) of signals generated by known seismic events or sources. In another example, if previously recorded seismic data is associated with a known event or source, the source of the respective data may be identified.

The method thus allows for both long-term monitoring and recording of seismic events, with reduced memory requirements. In addition, a relatively large number of seismic events and/or instances of seismic noise may be recorded and recognized.

The receiver 110 may be provided to operate in one or several of three different monitoring modes, depending upon the application required. In one mode, the receiver 110 constantly records data relating to the seismic waves received by the sensors 130. It will be appreciated, however, that in this mode the operational lifetime of the receiver 110 may be short unless a significant amount of memory is provided for the receiver 110.

In a second mode, the receiver 110 may be configured to record periodically. In this mode, the receiver 110 will reference the clock 140 in order to record for a first duration before ceasing recording for a second duration. The recording process then repeats. The first duration and second duration may be configured to meet the requirements of the survey and the available memory to the receiver 110, given the length in time of the survey. Recording durations, and intervals therebetween, may be set to time periods of varying length, and as desired.

In a third mode, the receiver 110 may be configured to record based on a triggering event, such as the reception of a seismic signal having a magnitude greater than a selected threshold magnitude. In this mode, the receiver 110 constantly collects data from the sensor 130 and stores the data in a temporary buffer location, such as a cache, which is overwritten, for example in a FIFO (first in first out) manner. At such time as the receiver 110 receives indication of a triggering event, it immediately copies the data stored in the cache to the memory device 135 and begins to record new incoming data to the memory device 135. The recording to the memory device 135 may continue according to a number of parameters. In one embodiment, the receiver 110 records for a set period of time. In another embodiment, the recording period is dependant upon the incoming seismic signals. For example, the receiver 110 may terminate recording ten (10) seconds after the seismic signal drops below the threshold level. The parameters of recording may be static or dynamic. Parameters may also differ from channel to channel. For example, the x component of a shallow well receiver 110 may be recorded for thirty (30) seconds following a triggering event; the y component may record until ten (10) seconds after the energy level detected falls below fifty (50) percent of the maximum value recorded on the channel for the last ten (10) minutes; the z component may record until the time the frequency of a detected signal changes. In one embodiment, however, the receiver 110 is designed to retrieve some noise on either side of the signal of interest. Once the triggering event is passed, the receiver 110 returns to its monitoring state to await the next event indication. In this mode, use of the memory device 135 in the receiver 110 may be limited, to provide for long term operation.

In another embodiment, the processor 145 within the receiver 110 may be used to further limit memory use or otherwise improve operation of the receiver 110. Such use of the processor 145 may include simple compression, or pre-processing of the data, such as mean averages based on a sliding window, with only the average being retained, normalization to a standard deviation value, wavelet transformation, and the like. In each case, the original data may be retained (which may not provide an additional memory benefit, but may provide for more expedient processing of retrieved data) or disposed of (which would provide for enhanced memory storage).

In one embodiment, the receiver 110 may also include a time stamp device to indicate a time of various events. The time stamp device may be synchronized with a surface timer, such as a Global Positioning System (GPS) time system, prior to disposing the receiver 110 in the wellbore 125.

If the receiver 110 is equipped with several sensors 130, the receiver 110 may be configured to trigger recording only a subset of the sensors 130 to record in response to a detected seismic event.

Once the term of the survey is over, the receiver 110 may be retrieved by fishing out of the wellbore 125 using one or more of several methods known in the art both now and in the future. At the surface, the memory 135 in the receiver 110 may be queried and the data analyzed in order to provide in-depth analysis of the seismic events detected.

In support of the teachings herein, various analysis components may be used, including digital and/or an analog systems. The devices and methods described herein may be implemented in software, firmware, hardware or any combination thereof. The device may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the devices and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. The computer executable instructions may be included as part of a computer system or provided separately.

Further, various other components may be included and called upon for providing for aspects of the teachings herein. For example, a pump, piston, power supply (e.g., at least one of a generator, a remote supply and a battery), motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A device for monitoring a seismic event, the device comprising:
   a self-contained structure adapted for being disposed within a wellbore and independently monitoring and recording seismic events, the self-contained structure comprising:
   a seismic sensor configured to receive a seismic signal generated by a formation;
   a memory device in communication with the seismic sensor configured to receive the seismic signal from the seismic sensor, store the seismic signal in a buffer memory location in the self-contained structure and use an indication that a magnitude of the seismic signal is greater than a threshold value to trigger a transfer of at least a portion of the seismic signal from the buffer memory location to a second memory location in the self-contained structure; and
   a processor for processing the data.

2. The device of claim 1, further comprising at least one of: a time measurement device for noting a time at which the seismic signal is received in the device, a time stamp device, a temporary buffer device for storing the seismic signal received during a selected time period, and a locking mechanism for securing the device to a portion of a wellbore.

3. The device of claim 1, wherein the processor is adapted for at least one of: deriving seismic data, computing an attribute of the seismic data, and storing at least one of the seismic data and the attribute.

4. The device of claim 2, wherein the locking mechanism comprises one or more protrusions extendable therefrom for engaging the portion of the wellbore.

5. The device of claim 1, wherein the self-contained structure includes at least one of: i) a housing for disposing therein the seismic sensor and at least one of the memory device and a power source, and ii) a hollow portion extending therethrough.

6. The device of claim 1, wherein the seismic sensor is adapted to be disposed within a side of the wellbore and is connected in communication with the memory device and a power source.

7. The device of claim 1, wherein the seismic signal represents at least one of: i) a subterranean seismic event, ii) a subterranean seismic event having a magnitude greater than a threshold magnitude, and iii) a microseismic event.

8. A method for monitoring a seismic event, the method comprising:
   disposing within a wellbore a device for monitoring seismic events that comprises a self-contained structure adapted for being disposed within a wellbore and independently recording seismic events;
   monitoring the seismic event generated by a formation with the device;
   storing seismic data related to the seismic event in a buffer memory location of the self-contained structure; and
   using an indication that a magnitude of the seismic signal is greater than a threshold value to trigger transferring at least a portion of the seismic data from the buffer memory location to a second memory location of the self-contained structure.

9. The method of claim 8, further comprising disposing at least one of the device and a seismic sensor within a side of the wellbore.

10. The method of claim 8, further comprising permanently cementing a seismic sensor within the side of the wellbore.

11. The method of claim 8, wherein disposing the device within the wellbore comprises lowering the device into the wellbore and securing the device to the wellbore.

12. The method of claim 11, wherein securing the device comprises extending one or more protrusions from a locking mechanism to engage a portion of the wellbore.

13. The method of claim 8, wherein disposing the device within the wellbore comprises: releasably attaching the device to a line, lowering the device on the line into the wellbore, securing the device in place, and releasing the line from the device.

14. The method of claim 8, wherein storing the seismic data includes receiving data from the seismic event via a seismic sensor and storing the data in the buffer memory location.

15. The method of claim 8, wherein storing seismic data includes at least one of continuously storing the seismic data received from each seismic event, and transferring at least a portion of the seismic data to the second memory location in response to at least one of the seismic events having a magnitude greater than a threshold magnitude.

16. The method of claim 8, wherein storing seismic data includes determining one or more periodic recording durations, and storing the seismic data received from each seismic event during the periodic recording durations.

17. The method of claim 8, wherein the transferring is performed in response to a seismic event having a magnitude greater than a threshold magnitude.

18. The method of claim 8, wherein the transferring includes:
   temporarily storing the seismic data in the buffer memory location during a selected time period; and
   in response to at least one seismic event having a magnitude greater than a threshold magnitude, time stamping the event and transferring the seismic data stored in the buffer memory location to the second memory location and storing data received during a selected time duration after the at least one seismic event in the second memory location.

19. The device of claim 8, wherein processing comprises: deriving seismic data, computing an attribute of the seismic data, and storing at least one of the seismic data and the attribute.

20. A device for monitoring a seismic event, the device comprising:
- a self-contained structure adapted for being disposed within a wellbore and independently monitoring and recording the seismic event generated by a formation;
- first means for temporarily storing seismic data related to the seismic event in a first memory location of the self-contained structure;
- second means for using an indication that a magnitude of the seismic data is greater than a threshold value to trigger transferring the seismic data to a second memory location of the self-contained structure from the first memory location; and
- third means for providing power to at least one of the first means and the second means.

\* \* \* \* \*